United States Patent
Abts

(10) Patent No.: US 10,933,722 B2
(45) Date of Patent: Mar. 2, 2021

(54) CONDITIONING DEVICE FOR RECREATIONAL VEHICLE VENTILATION INTAKES

(71) Applicant: Wacko Products LLC, Hobart, WI (US)

(72) Inventor: Darrell J. Abts, Hobart, WI (US)

(73) Assignee: Wacko Products LLC, Hobart, WI (US)

( * ) Notice: Subject to any disclaimer, the term of this patent is extended or adjusted under 35 U.S.C. 154(b) by 296 days.

(21) Appl. No.: 15/975,188

(22) Filed: May 9, 2018

(65) Prior Publication Data

US 2018/0326819 A1 Nov. 15, 2018

Related U.S. Application Data

(60) Provisional application No. 62/503,659, filed on May 9, 2017.

(51) Int. Cl.
| | |
|---|---|
| *B60H 3/06* | (2006.01) |
| *B60H 1/24* | (2006.01) |
| *B60H 1/00* | (2006.01) |

(52) U.S. Cl.
CPC ....... *B60H 3/0616* (2013.01); *B60H 1/00364* (2013.01); *B60H 1/245* (2013.01); *B60H 3/0658* (2013.01); *B60H 2001/006* (2013.01)

(58) Field of Classification Search
CPC ............... B60H 1/245; B60H 1/00364; B60H 2001/006; B60H 3/0616; B60H 3/0658
USPC ....................................................... 454/158
See application file for complete search history.

(56) References Cited

U.S. PATENT DOCUMENTS

| | | | | |
|---|---|---|---|---|
| 2,575,499 | A * | 11/1951 | Manow | B01D 46/10 55/422 |
| 4,722,747 | A * | 2/1988 | Armbruster | B01D 46/0002 96/140 |
| 7,789,928 | B2 * | 9/2010 | Stepp | B01D 46/10 55/495 |
| 7,993,434 | B2 * | 8/2011 | Oscar | B01D 46/008 95/273 |
| 10,143,953 | B1 * | 12/2018 | Lee | B01D 46/0038 |
| 2002/0069599 | A1 * | 6/2002 | Dhallan | F24F 13/082 52/302.1 |
| 2014/0250654 | A1 * | 9/2014 | Forest | B60H 1/243 29/402.08 |
| 2017/0151526 | A1 * | 6/2017 | Cole | F24F 13/28 |

* cited by examiner

*Primary Examiner* — Steven B McAllister
*Assistant Examiner* — Allen R Schult
(74) *Attorney, Agent, or Firm* — Andrus Intellectual Property Law, LLP

(57) ABSTRACT

A conditioning device for a ventilation intake, the conditioning device having a frame with a mounting side, an access side, and a plurality of walls coupled between the mounting side and the access side. The mounting side defines a ventilation intake opening that is configured to receive at least a portion of the ventilation intake. The access side defines an access opening. An access panel has coupling features for removably coupling the access panel to the frame, where the access opening of the frame is accessible when the access panel is removed from the frame. The conditioning device is configured to cover the ventilation intake. At least one inlet is defined within at least one of the frame and the access panel and air enters the conditioning device through the at least one inlet.

17 Claims, 11 Drawing Sheets

CONDITIONING DEVICE FOR RECREATIONAL VEHICLE VENTILATION INTAKES

CROSS REFERENCE TO RELATED APPLICATION

The present application is based on and claims priority to U.S. Provisional Patent Application Ser. No. 62/503,659 filed May 9, 2017, the disclosure of which is incorporated herein by reference.

FIELD

The present disclosure generally relates to devices and methods for conditioning ventilation intakes, and more particularly to quieting and filtering the ventilation intake for air conditioners mounted in the ceiling of a recreational vehicle (RV).

BACKGROUND

The Background and Summary are provided to introduce a foundation and selection of concepts that are further described below in the Detailed Description. The Background and Summary are not intended to identify key or essential features of the potentially claimed subject matter, nor are they intended to be used as an aid in limiting the scope of the potentially claimed subject matter.

SUMMARY

Certain embodiments of the present disclosure generally relate to a conditioning device for a ventilation intake. The conditioning device has a frame with a mounting side, an access side, and a plurality of walls coupled between the mounting side and the access side. The mounting side defines a ventilation intake opening that is configured to receive at least a portion of the ventilation intake. The access side defines an access opening. An access panel has coupling features for removably coupling the access panel to the frame, where the access opening of the frame is accessible when the access panel is removed from the frame. The conditioning device is configured to cover the ventilation intake. At least one inlet is defined within at least one of the frame and the access panel and air enters the conditioning device through the at least one inlet.

Another embodiment generally relates to a conditioning device for a ventilation intake in a ceiling. The conditioning device has a frame with a mounting side configured to be coupled to the ceiling, an access side, and a plurality of walls coupled between the mounting side and the access side. The mounting side defines a ventilation intake opening that is configured to receive at least a portion of the ventilation intake. The access side defines an access opening. A filter receiver is configured to retain a filter such that air from outside the conditioning device is directed to the ventilation intake through the filter. The filter is removable from the filter receiver without removing the conditioning device from the ceiling. An access panel has coupling features for removably coupling the access panel to the frame. The access opening of the frame is accessible when the access panel is removed from the frame. The conditioning device is configured to cover the ventilation intake. At least one inlet is defined within at least one of the frame and the access panel and the air enters the conditioning device through the at least one inlet.

BRIEF DESCRIPTION OF THE DRAWINGS

The drawings illustrate the best mode presently contemplated of carrying out the disclosure. The same numbers are used throughout the drawings to reference like features and like components. In the drawings.

DETAILED DISCLOSURE

This written description uses examples to disclose embodiments of the present application, including the best mode, and also to enable any person skilled in the art to practice or make and use the same. The patentable scope of the invention is defined by the potential claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Recreational vehicles, or RVs, are generally characterized as motor vehicles or trailers equipped to provide a living space and the typical amenities found in homes, while also being readily moveable. Specifically, most RVs are configured to be drivable or towable on highways and roads. These vehicles, also referred to as camper vans, caravans, or motor homes, can be traced back to wagons dating back at least to the early 1800s. Modern RVs and the recreational activity of camping and travelling with RVs gained particular popularity within the United States in the mid to late 1900s. Over this time, these vehicles have increased in complexity, functionality, and luxury with respect to home-like accommodations. It is now common for RVs to include air conditioning (A/C) units to provide comfort to occupants. However, the present inventor has identified that the noise and low quality of the air produced by such A/C units each detract from the comfort and overall experience of enjoying the RV lifestyle. Accordingly, the present inventor has developed the following systems and methods for reducing the noise and/or improving the air quality of an RV air conditioner, including retrofittable configurations to be incorporated over existing RV air conditioning units, including those mounted to the ceiling.

Figure 1:
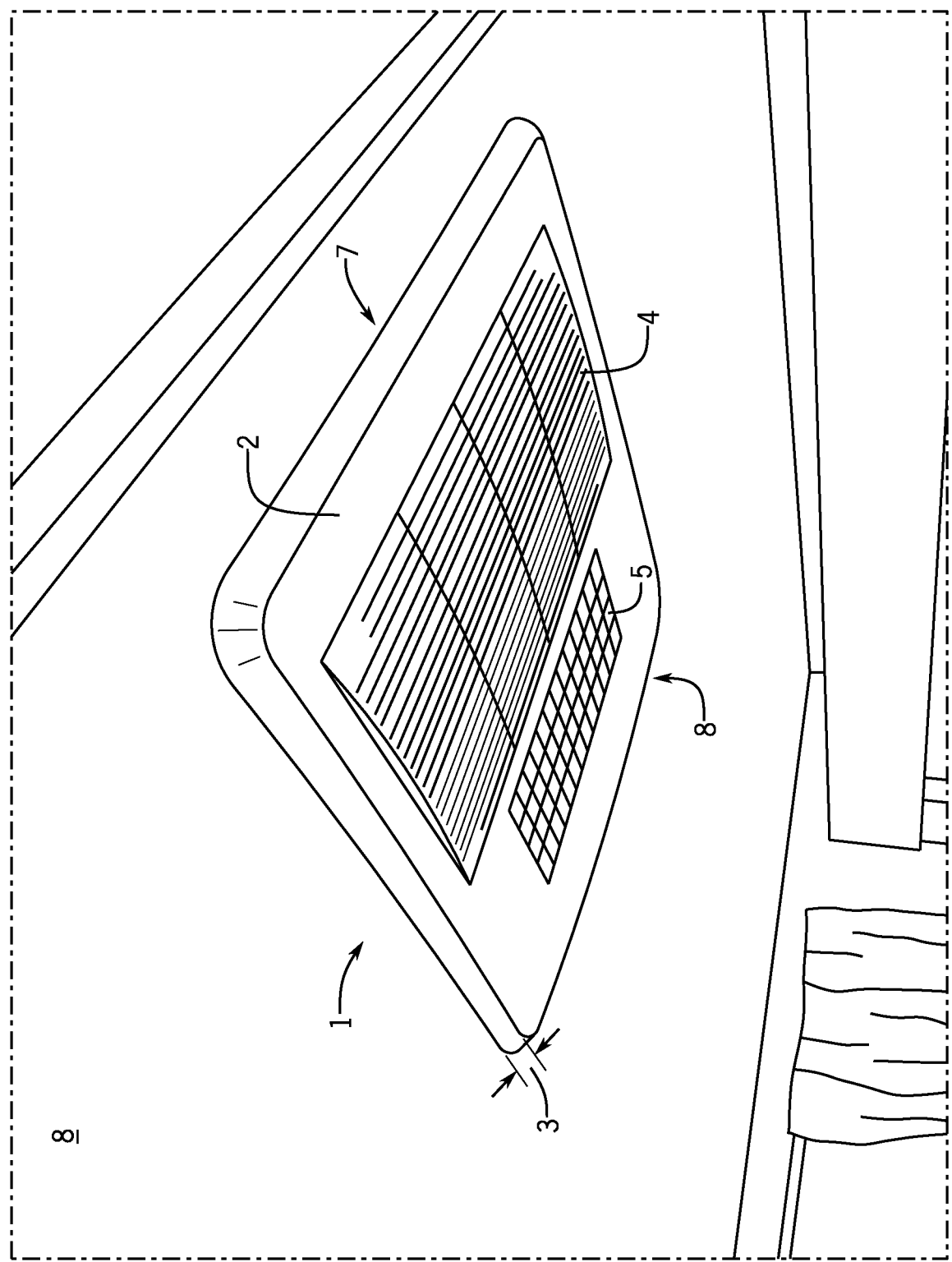
FIG. 1 depicts an in-ceiling RV air conditioner unit as known in the art.

FIG. 1 depicts ventilation intake 1 for a ventilation unit, such as an air conditioning (A/C) unit mounted into the ceiling of an RV. An A/C faceplate 2 includes openings 4 for the ventilator intake 1 (the remainder of the A/C unit not shown). The ventilation intake 1 provides air to the A/C unit or other ventilation system in the customary manner known in the art. Likewise, the air is subsequently returned via ventilation outlets 5. In the example shown, the A/C faceplate 2 has a thickness 3. It should be recognized that in certain embodiments, the ventilator intake 1 and the ventilator outlet 5 may be positioned apart, rather than on the same A/C faceplate 2. In such cases, one or more of the presently disclosed conditioning device 10 may be incorporated. For later reference, the A/C faceplate 2 is labeled as having a front 7 and back 8. Through use and experimentation with A/C unit such as that shown, the present inventor has identified that the blower motor, compressor, and other aspects of the A/C unit, as well as the consequent air flow, produce substantial noise through the A/C faceplate 2. Furthermore, the air is taken in the ventilation intake 1 without any filtering, resulting in poor air quality throughout the interior cabin of the RV and increasing wear and tear on the components of the ventilation unit due to dust and debris. Similar nuisance noise and quality issues are also present at the ventilator outlet 5 in certain cases.

Figure 2:
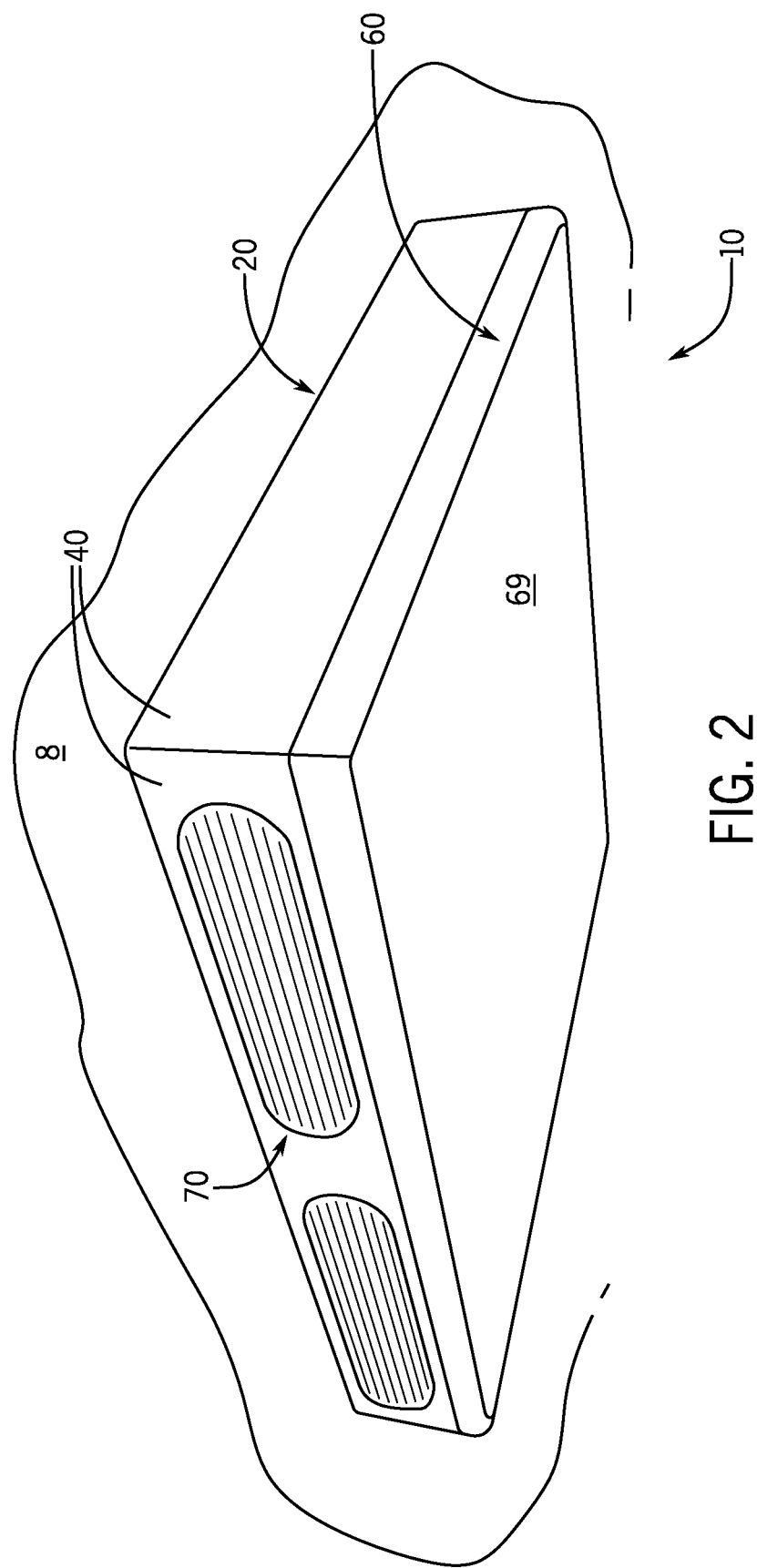
FIG. 2 depicts a conditioner device in accordance with the present disclosure installed in conjunction with an RV air conditioner.

FIG. 2 depicts an exemplary conditioning device 10 in accordance with the present disclosure mounted to the ceiling of an RV over an existing A/C faceplate 2. As shown, the conditioning device 10 has a frame 20 with a mounting side 22 that is mounted to the ceiling of the RV (mounting surface 8), a plurality of walls 40, and an access side 30 that faces downwardly. An access panel 60 is removably coupled to the frame 20 on the access side opposite the ceiling. The plurality of walls 40 in the present embodiment includes one or more inlet faces 42A with inlets 70 and one or more non-inlet faces 42B without. In certain embodiments, these inlets have corresponding inlet covers 72, which in certain embodiments include adjustable louvers to change the flow rate and/or direction of air entering the inlet 70. The inlet covers 72 are coupled in place via a press-fit, adhesives, or other techniques that would be known to one of ordinary skill in the art.

Figure 3:
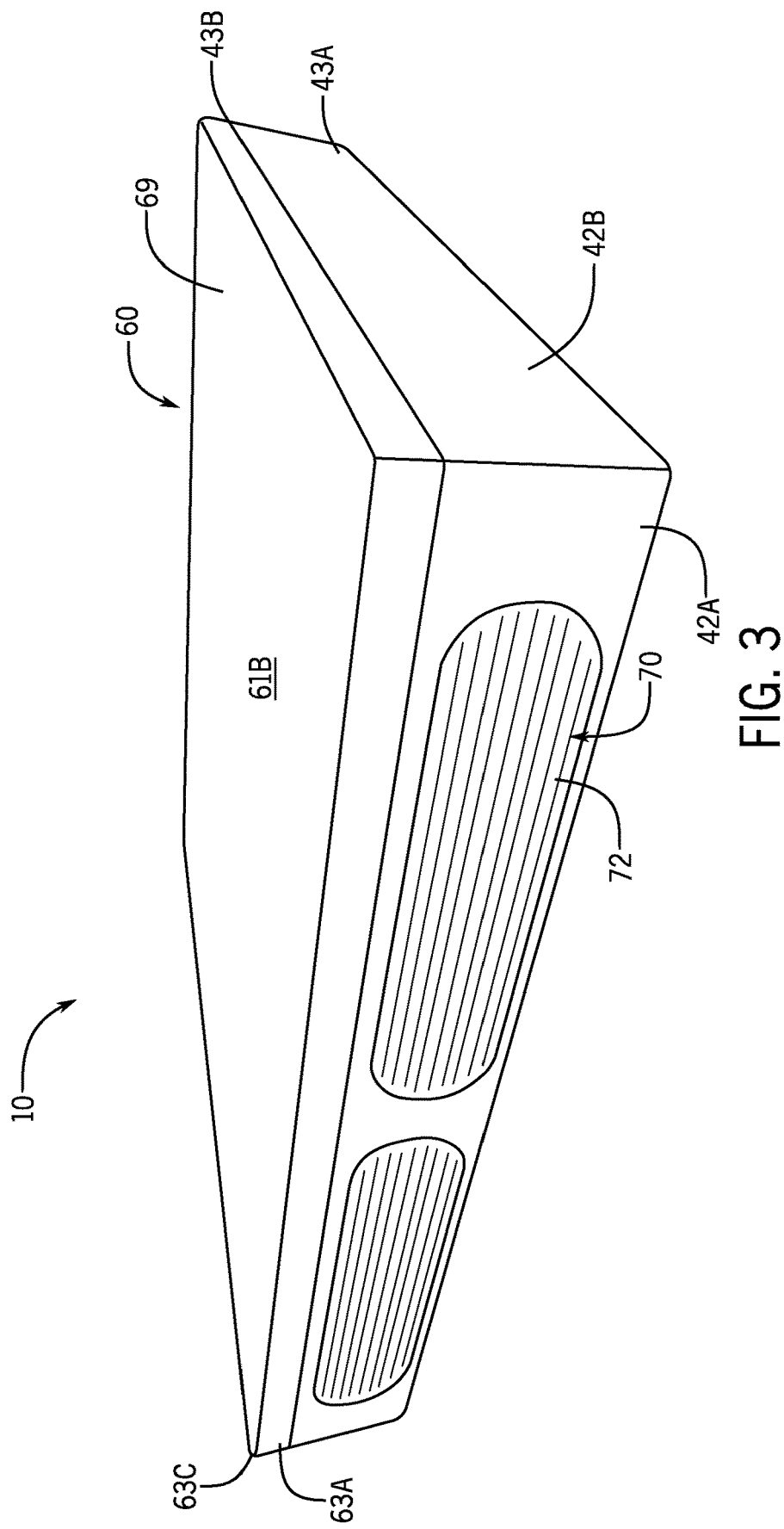
FIG. 3 depicts the conditioner device from FIG. 2, removed from the ceiling and rotated with the access panel oriented upwardly.

FIG. 3 depicts the conditioning device 10 from FIG. 2, removed from the ceiling and inverted such that the access panel 60 is now facing upwardly. In the embodiment shown, the outer surface 61B of the conditioning device 10 is covered with a cushion 69, such as a vinyl fabric that is both durable and easily cleaned. However, it should be noted that other external facades are also anticipated by the present disclosure, accommodating varying needs and preferences of users, performance characteristics, and the ability to accommodate different RVs, ceiling colors, and materials, for example. The access panel 60 has a distal edge 63C and an opposite frame 63A in contact with an access edge 43B of the frame 20 that is opposite of a mount edge 43A.

Figure 4:
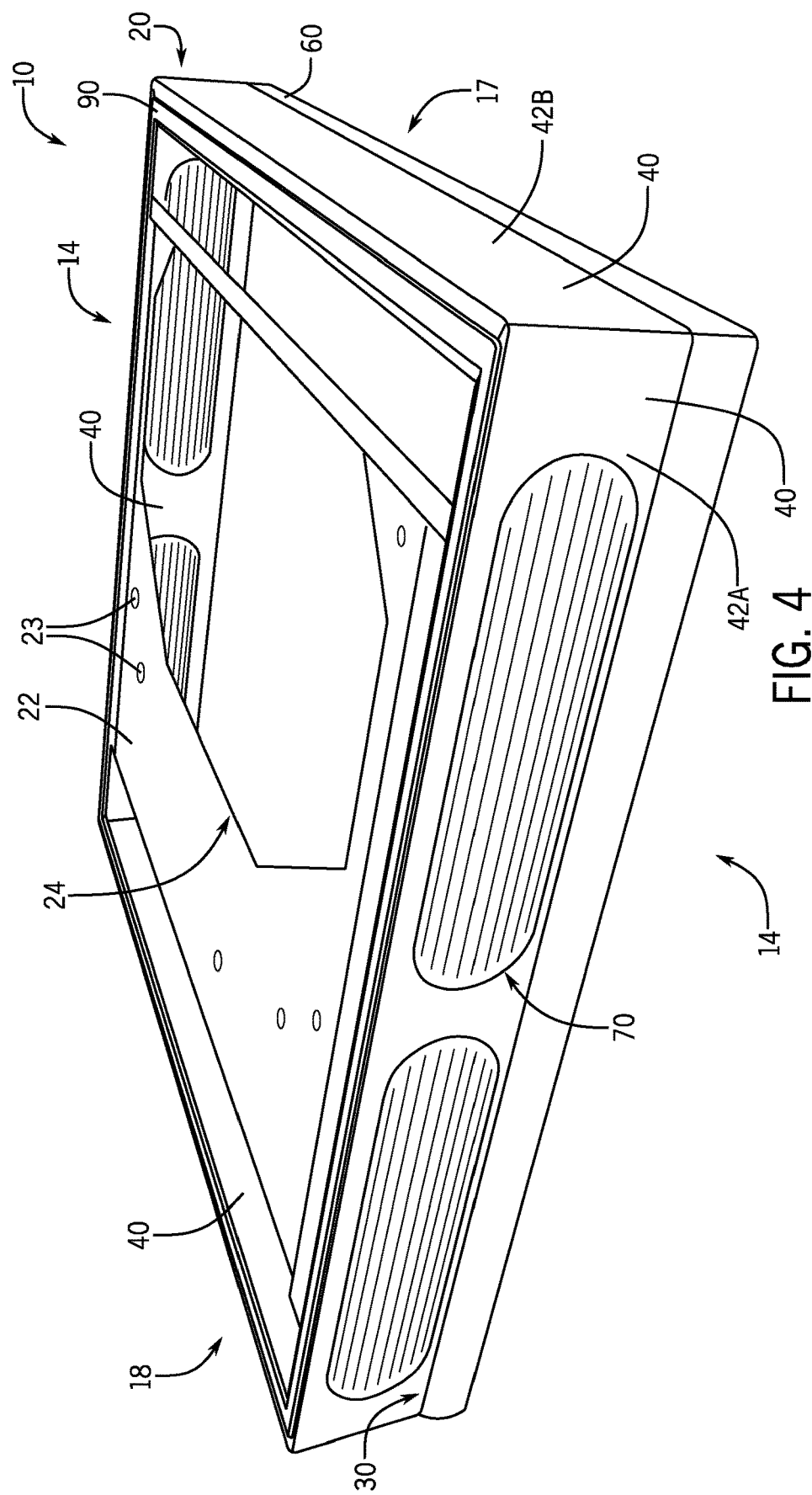
FIG. 4 depicts the conditioner device from FIG. 3, but rotated with the access panel oriented downwardly.

FIG. 4 depicts the conditioning device from FIG. 3, inverted such that the access side 30 and access panel 60 are once again oriented downwardly. The mounting side 22 of the frame 20 defines a ventilation intake opening 24 configured to receive the A/C faceplate 2 therein. Accordingly, in the embodiment shown, the mounting side 22 is substantially open, accommodating a wider range of ventilation intakes 1 in existing vehicles or other locations. FIG. 4 further discloses a plurality of mounting holes 23 within the mounting side 22 for mounting the conditioning device 10 to the ceiling of an RV after the conditioning device 10 is oriented with the A/C faceplate 2 aligned within the ventilation intake opening 24 of the conditioning device 10.

FIG. 4 further depicts a gasket 90 positioned on the mounting side 22 such that it becomes sandwiched between the frame 20 and the mounting surface 8 when the conditioning device 10 is installed thereon. In the present embodiment, the ventilation intake opening 24 is shaped such that the front 17 and back 18 of the conditioning device 10 align with the front 7 and back 8 of the A/C faceplate 2, respectively, when installed.

Figure 5:
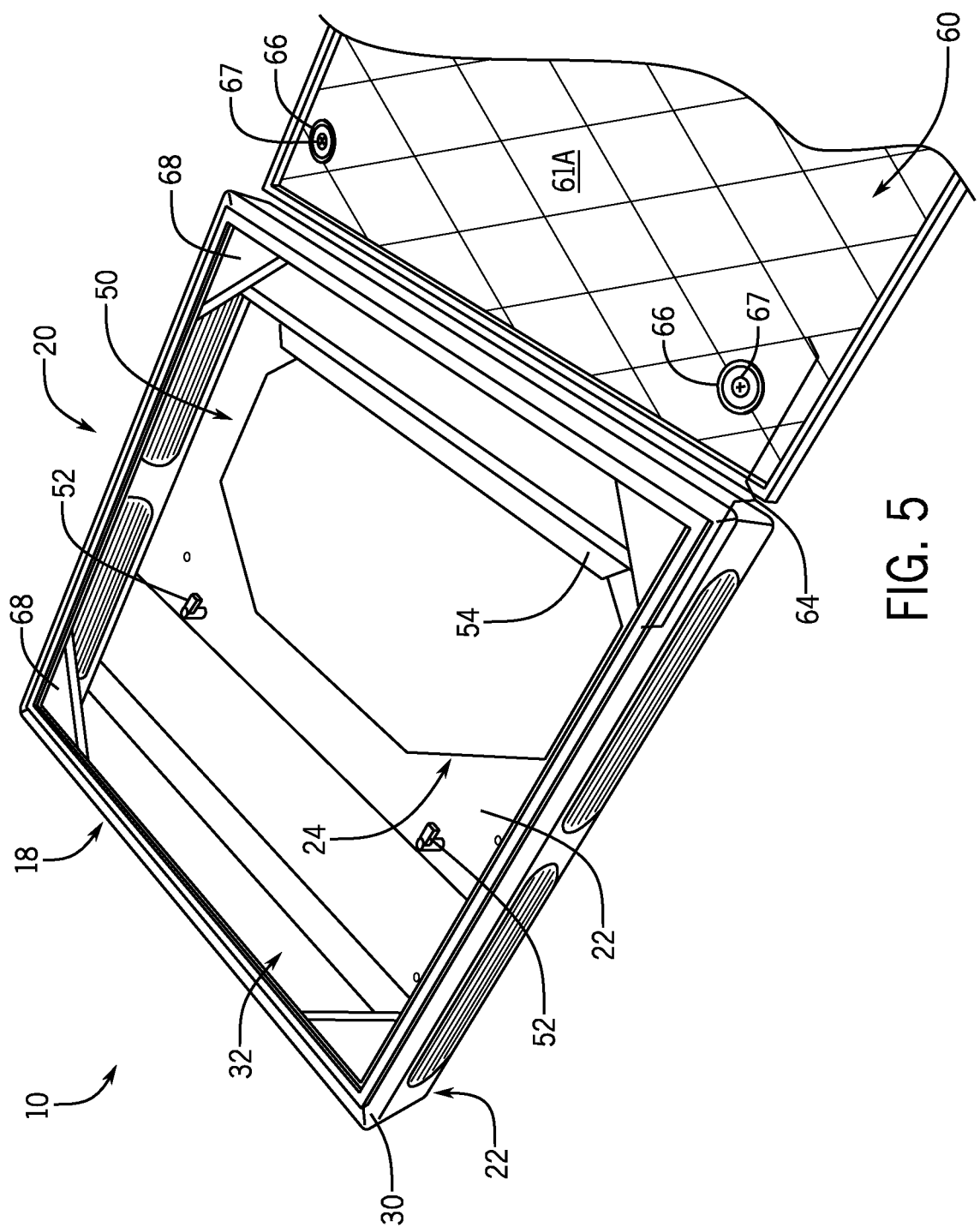
FIG. 5 is an overhead view similar to FIG. 3 with the access panel has been removed.

FIG. 5 depicts the conditioning device 10 from FIG. 4, flipped such that the mounting side 22 is again facing downwardly, similarly to the conditioning device 10 shown in FIG. 3. The access panel 60 has been removed to reveal the access side 30 of the frame 20. The inner surface 61A of the access panel 60 can also be seen, which in other embodiments incorporates further sound attenuation material 92 known in the art (see FIG. 7). Viewing downwardly into the access opening 32 defined within the access side 30, the opposite side of the mounting side 22 can be seen, along with the intake opening 24 defined therein. A filter receiver 50 is shown coupled within the frame 20, which may be integrally formed or coupled subsequently using conventional methods known in the art, such as adhesives or welding. The embodiment shown includes a filter receiver lip 54 for at least partially retaining a filter 80 (specifically a filter frame 82 and filter media 86, see FIG. 6) positioned over the ventilation intake opening 24 defined in the mounting side 22.

FIG. 5 also shows one exemplary configuration of a coupling feature 64 for coupling the access panel 60 to the frame 20. Specifically, the coupling feature of this conditioning device 10 includes magnetically-receptive mounts 68, shown here to be comprised of a ferrous material and substantially positioned in each of the four corners of the conditioning device 10. Corresponding magnets 66 are coupled to the corners of the access panel 60, shown here as circular magnets, via couplers 67, such as screws. Accordingly, the access panel 60 of the present embodiment is secured to the frame 20 by positioning the magnets 66 near the magnetically-receptive mounts 68, providing a removable securement therebetween. It should be recognized that the magnets 66 may be coupled to the frame 20 with the access panel 60 being or having a magnetically-receptive mount 68 in similar embodiments.

Figure 6:
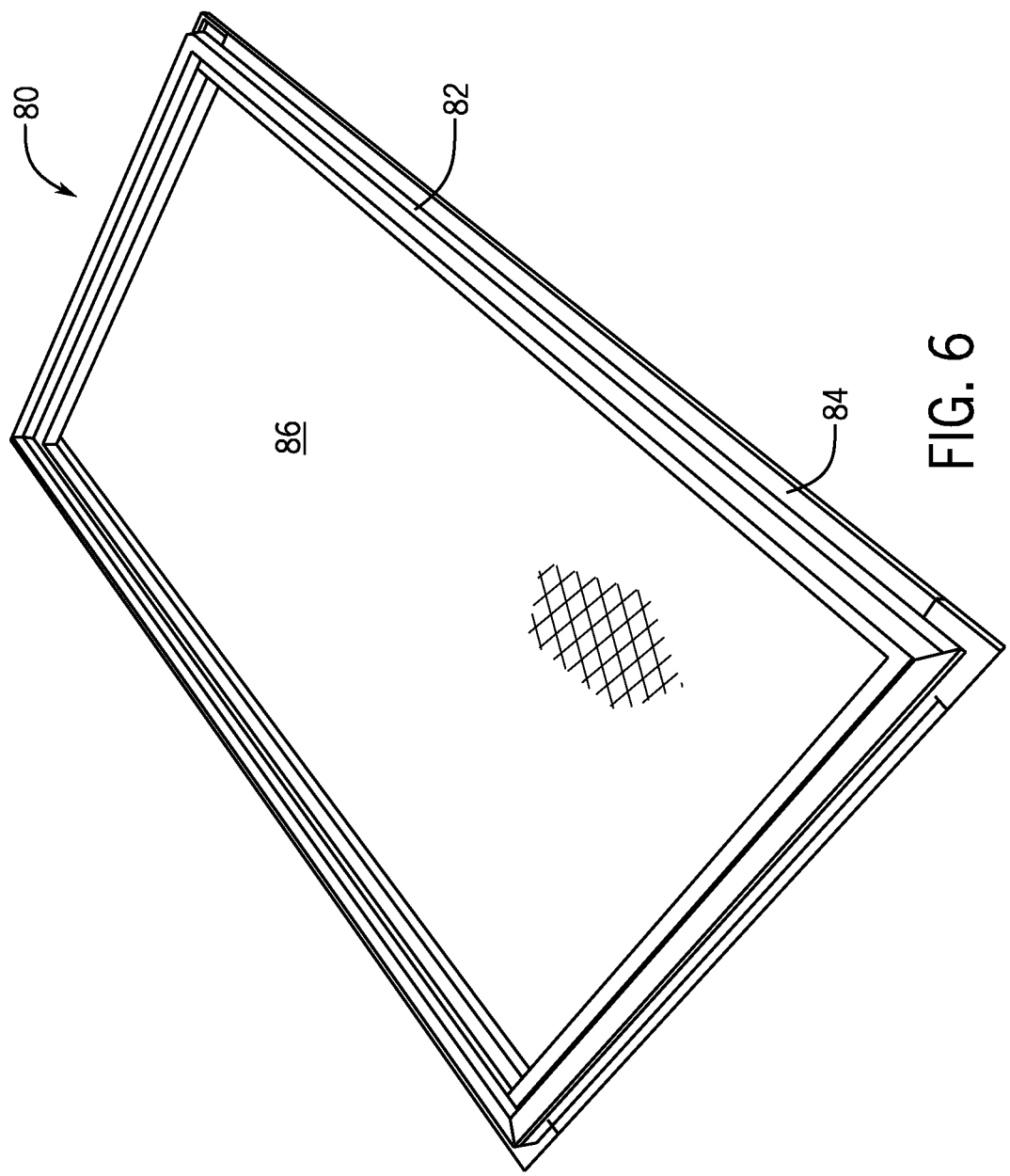
FIG. 6 depicts an exemplary filter to be incorporated into the conditioning device shown in FIG. 5.
Figure 7:
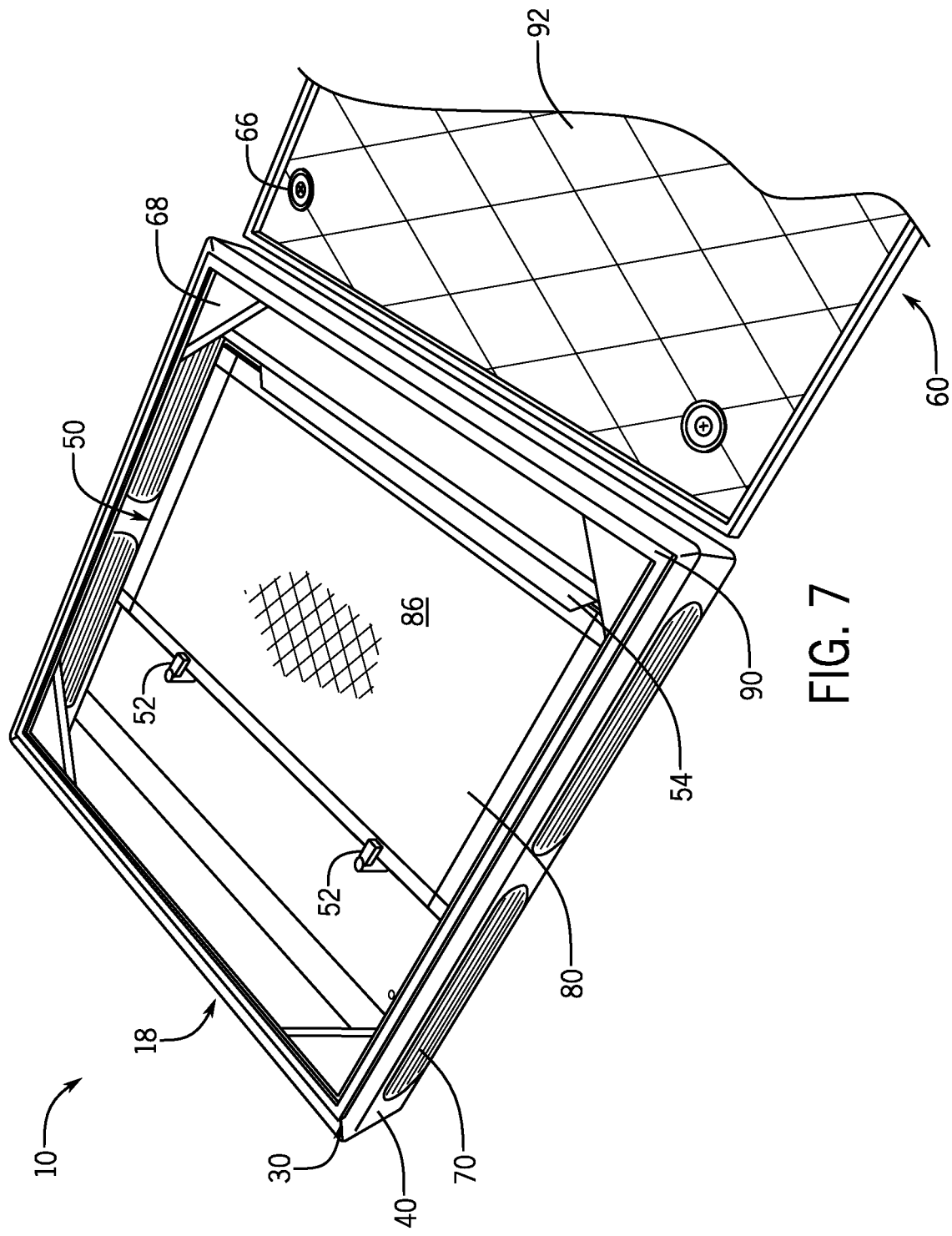
FIG. 7 depicts the conditioning device shown in FIG. 5 with the filter of FIG. 6 installed therein.
Figure 9:
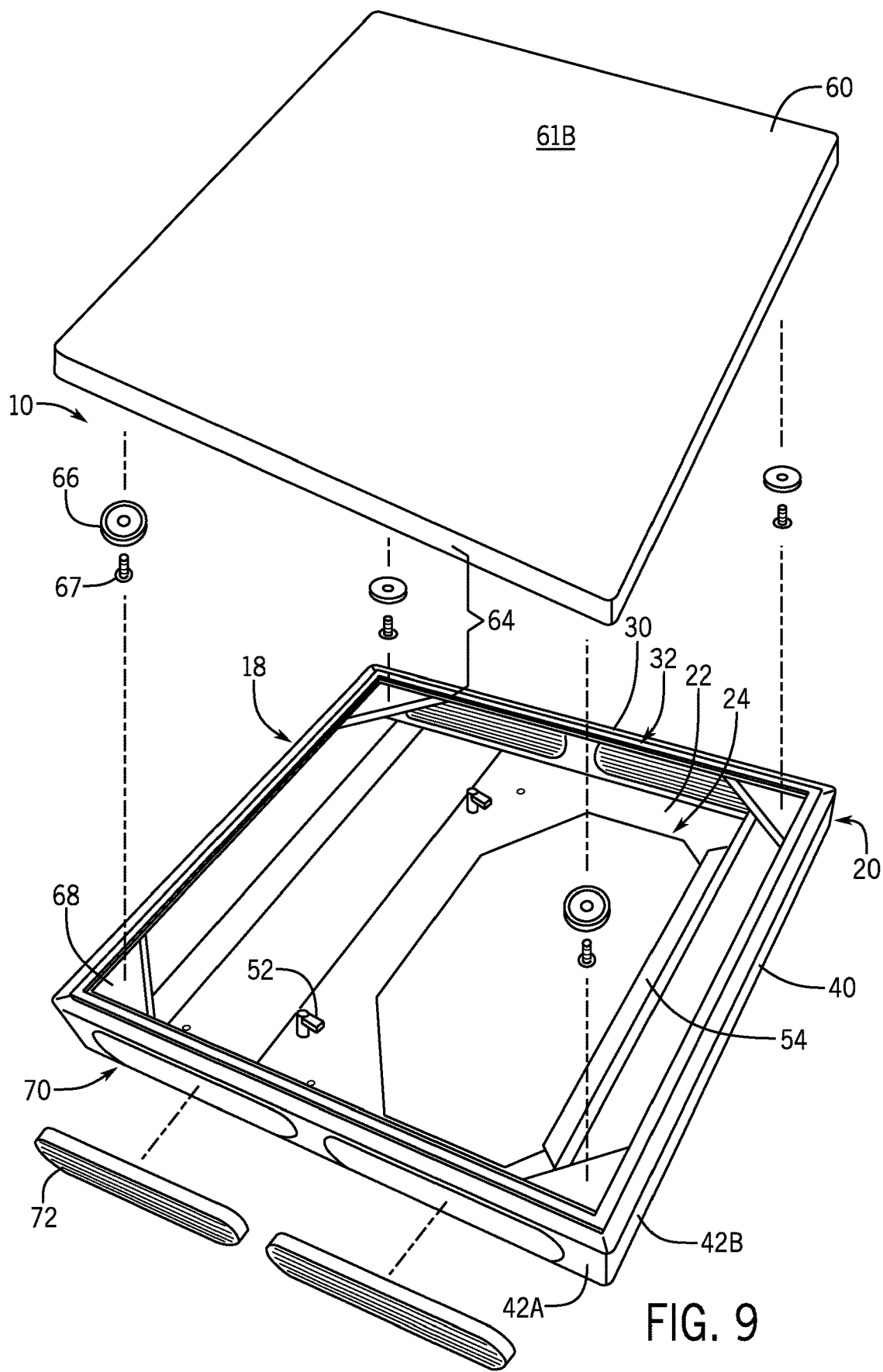
FIG. 9 is an exploded view of a conditioning device similar to that of FIG. 7.

FIG. 6 depicts one embodiment of a filter 80 to be used in accordance with the presently disclosed conditioning device 10. In certain embodiments, the filter frame 82 has a gasket (not shown) substantially surrounding the parameter on the A/C faceplate 2 side such that the gasket provides an air and/or sound emission seal between the filter frame 82 and the mounting side 22 of the conditioning device 10 and/or A/C faceplate 2. FIG. 7 shows the filter 80 installed within the frame 20. Specifically, a mounting lip 84 of the filter frame 82 is received within the filter frame receiver lip 54. In the embodiment shown, rotatable couplers 52 secure at least a portion of the filter 80 in place, here only the edge opposite that supported within the filter receiver lip 54. An exploded view of a similar conditioner device 10 is also shown in FIG. 9.

Figure 8:
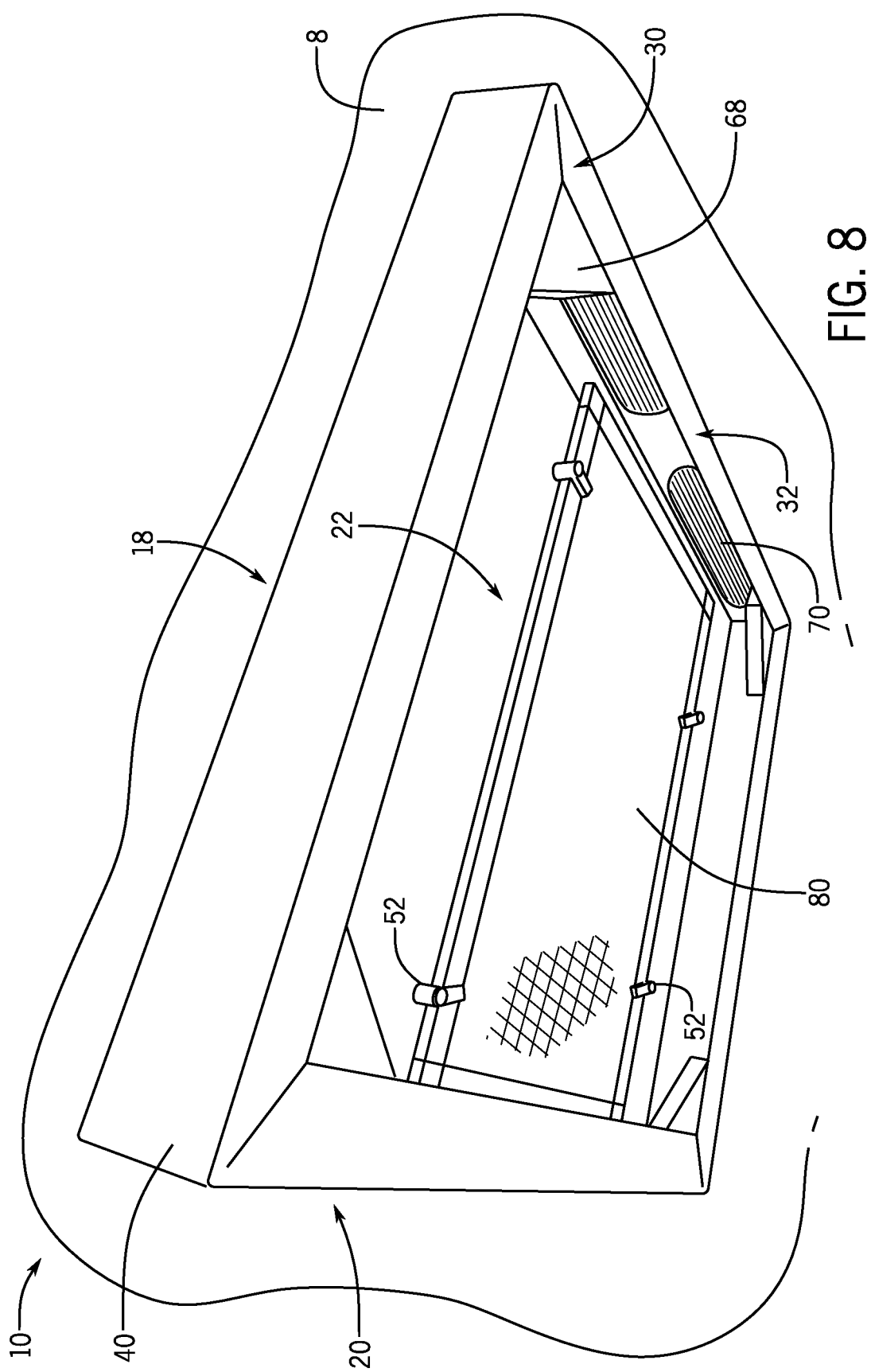
FIG. 8 depicts a conditioning device similar to FIG. 2, but wherein the access panel has been removed.

FIG. 8 shows another embodiment of filter receiver 50 and coupler 52, here four couplers 52. In the embodiment shown, instead of the filter receiver lip 54, the additional couplers 52 are provided such that the filter 80 is secured to the conditioning device 10.

It should be recognized that while the filter 80 is presently shown coupled to the frame 20, it could also or alternatively be coupled elsewhere, such as to the access panel 60.

FIG. 8 further depicts the conditioning device 10 and filter 80 in a fully installed configuration on the mounting surface 8 of an RV. As shown, the filter 80 substantially covers the A/C faceplate 2 of the A/C unit such that air intake for the A/C unit must go through the filter media 86, and such that the entire A/C faceplate 2 is contained within the conditioning device 10. Accordingly, when the access panel 60 is subsequently attached to the conditioning device 10, the access panel 60, filter 80, and remaining sides 40 of the conditioning device 10 provide a reduction of sound emitted from the A/C unit through the A/C faceplate 2. In certain embodiments, additional sound attenuation material 92 is provided for reducing the sound output level that is audible from outside the conditioning device (relative to the sound output level generated by the A/C unit or ventilator intake thereof), such as shown in FIG. 7. In further embodiments, the mounting side 22 of the conditioning device 10 includes a structure 25 for preventing the filter 80 and/or sound attenuation material 92 from being sucked into or against the ventilator intake 1 during operation. The structure 25 in certain embodiments further acts as a stiffener for the frame 20 overall.

In the embodiment shown in FIG. 8, the inventor has configured the conditioning device 10 to accept a reloadable (or replaceable) Mery 11 air filter therein as the filter 80. Specifically, the present inventor has configured the conditioning device 10 to accept the Mery 11 as one readily-available air filter in the market, allowing filter 80 replacements to be easily obtained and reasonably affordable. However, it should be known that the present disclosure anticipates other configurations to accommodate different shapes, configurations, constructions, and materials of other filters 80 within the presently disclosed conditioning device. Moreover, different filters 80, whether known or custom configured for the conditioning device, enable the presently disclosed conditioning device to accommodate different types, sizes, and configurations of A/C faceplates 2 as required by different RV manufacturers, as well as for other A/C units, such as might exist on a boat, bus, trailer, or other containers or spaces.

Figure 10:
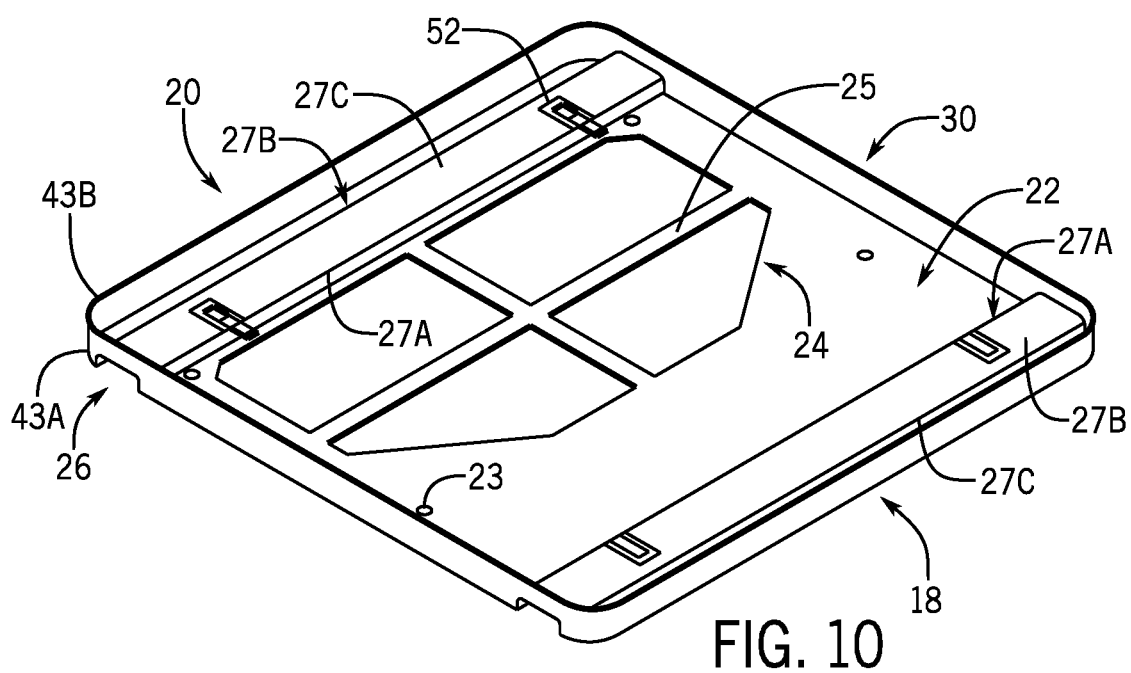
FIGS. 10-12 depict another embodiment of a conditioning device according to the present disclosure.
Figure 11:
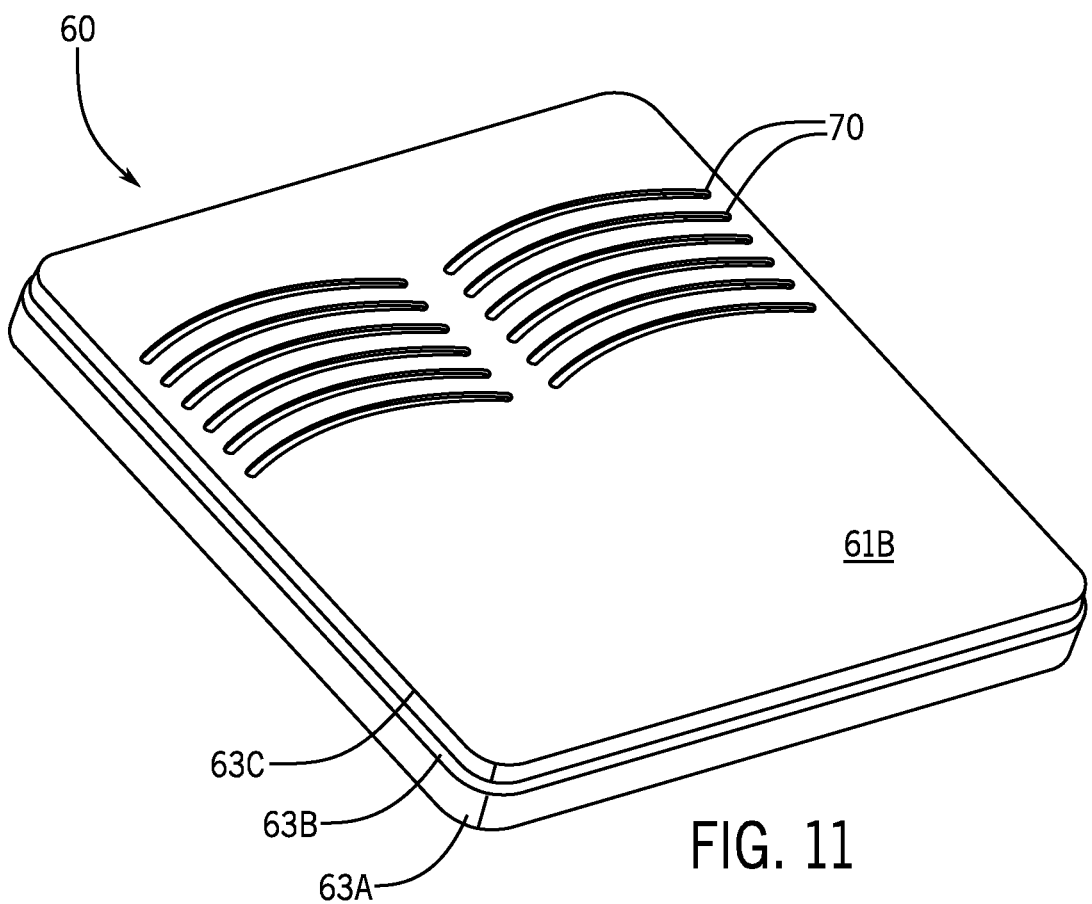
Figure 12:
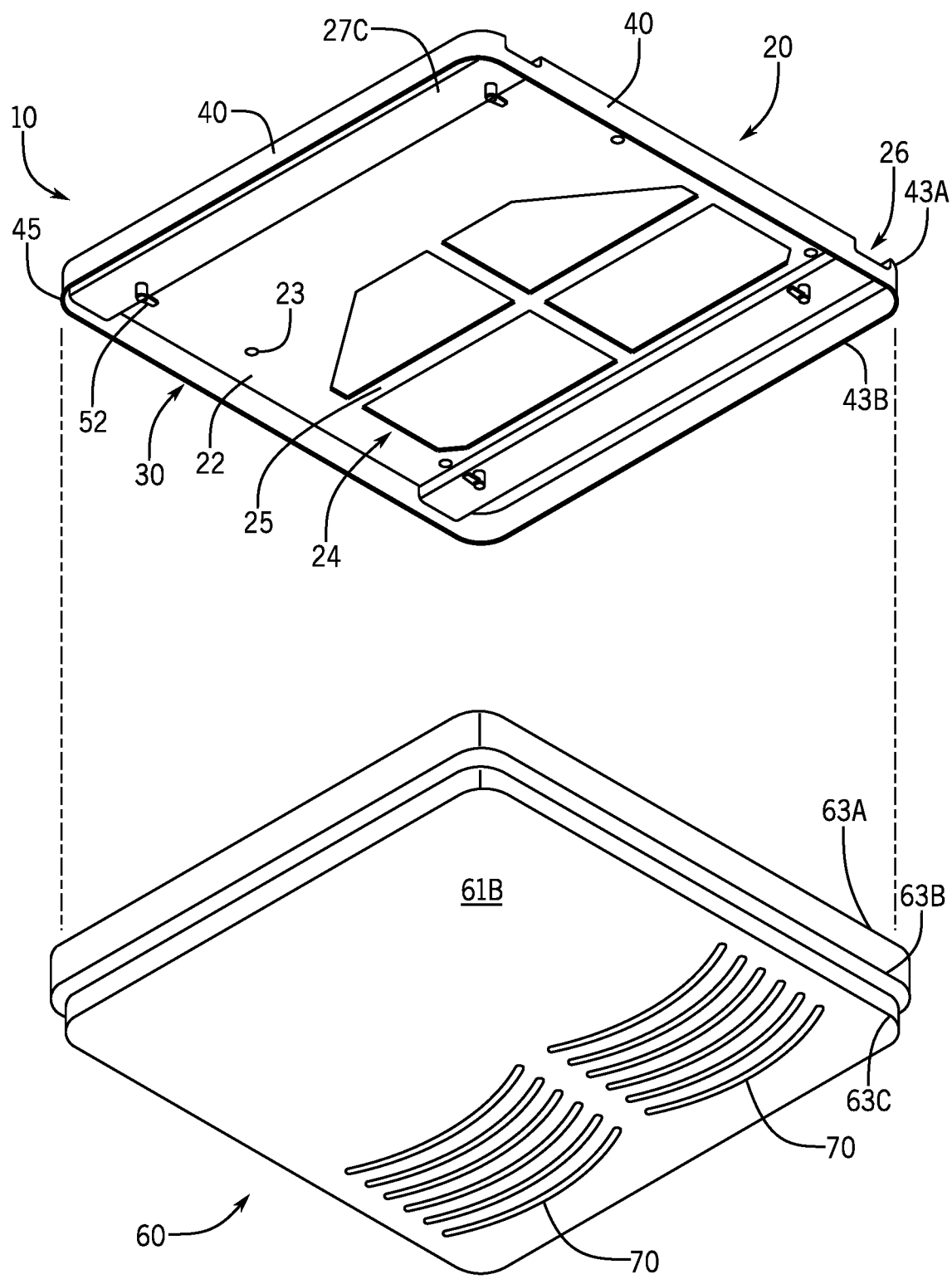

FIGS. 10-12 depict another alternative embodiment of the presently disclosed conditioning device 10. FIG. 10 depicts a frame 20 shown with the access side 30 facing upwardly and the mounting side 22 downwardly. In contrast to the various embodiments previously discussed, the frame 20 presently shown incorporates two channels 26 that extend inwardly from the mounting side 22. The channels 26 of the present embodiment incorporate inner faces 27A, outer faces 27B, and bottom faces 27C therebetween. As shown, the inner faces 27A provide a structure by which a filter (not shown) may be placed within the frame 20 therebetween. In this manner, the filter may be locked in position by couplers 52, which in the present embodiment are sliding locks.

The present inventor has identified that one benefit of the conditioning device 10 shown in FIGS. 10 and 11 includes the cost-savings of a design capable of being injection molded out of plastic. FIG. 11 shows a corresponding access panel 60, which in the present embodiment defines the inlets 70, in contrast to the inlets 70 being defined within the frame 20. In the embodiment shown, the access panel 60 has a frame edge 63A, mid edge 63B, and a distal edge 63C. In certain embodiments, the distance between the frame edge 63A and the mid edge 63B corresponds substantially to the distance between the mount edge 43A and the access edge 43B of the walls 40 of the frame 20 (see FIG. 10). However, the access panel 60 may instead be configured to be substantially the same height as the frame 20 in other embodiments. It should further be noted that in the present embodiment, the filter, an additional filter, and/or sound attenuation material 92 may also be incorporated within the access panel 60.

As shown in a similar embodiment depicted in FIG. 12, the conditioning device 10 may alternatively include other forms of couplers 52 for securing a filter 80, such as the rotating style previously discussed. Moreover, the present embodiment depicts a lip 45 defined within the access edge 43B of the walls 40. However, it should be recognized that the present disclosure further anticipates other mechanisms for coupling the access panel 60 to the frame 20, including the magnets 66 and magnetically-receptive mount 68 coupling feature 64 previously discussed.

As with the embodiment of FIGS. 10 and 11, FIG. 12 depicts a frame 20 having two channels 26 defined therein. Through experimentation and development, the present inventor has identified that providing these channels 26 adds structural strength to the conditioning device 10, while also permitting the conditioning device 10 to be installed on mounting surfaces 8 having otherwise-conflicting mounting hardware. Moreover, the access panel 60 of certain embodiments is designed such that the channels 26 of the frame 20 are not visible when the access panel 60 is coupled thereto, providing an overall seamless appearance when the conditioning device 10 is installed.

While not expressly shown in FIG. 12, the access panel 60 in certain embodiments incorporates sound attenuation materials 92, which provides soundproofing and frequency dampening to reduce the perceivable sound output level generated by the ventilation intake 1 during operation. In certain embodiments, the sound attenuation material 92 is eco-friendly, made out of such materials as recycled blue jeans. The present inventor has identified that through careful selection of this sound attenuation material 92, further mildew and mold resistance may be provided to the conditioning device 10, as well as protection therefrom for the overall A/C unit.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other devices. It is to be expected that various equivalents, alternatives and modifications are possible within the scope of any appended claims.

I claim:

1. A conditioning device for replacing a ceiling-mounted faceplate that communicates air to and from an air conditioning unit, the conditioning device comprising:
   a frame having a mounting side, an access side that is opposite the mounting side, and a plurality of walls coupled between the mounting side and the access side, wherein the mounting side is configured to be coupled to a ceiling such that the mounting side is below the ceiling and the plurality of walls extend downwardly from the mounting side, wherein the mounting side defines a ventilation intake opening that communicates the air from the conditioning device into the air conditioning unit, wherein the access side defines an access opening that communicates the air into the conditioning device;
   an access panel having coupling features for removably coupling the access panel to the frame, wherein the access opening of the frame is accessible when the access panel is removed from the frame, and wherein the frame remains in position on the ceiling when the access panel is removed; and a filter receiver configured to retain a filter such that the air entering the conditioning device is directed through the filter before entering the ventilation intake opening;

wherein at least one inlet is defined within at least one of the frame and the access panel, and wherein the air is communicated into the conditioning device through the at least one inlet; and wherein the air conditioning unit generates a sound output level when operating at a location below the ceiling where the air is provided to the air conditioning unit, further comprising sound attenuation material retained between the mounting side and the access side of the frame, wherein the sound attenuation material reduces the sound output level at the location below the ceiling relative to the sound output level without the sound attenuation material.

2. The conditioning device according to claim 1, wherein the at least one inlet includes multiple curved inlets defined in the access panel.

3. The conditioning device according to claim 1, wherein the at least one inlet includes a louvered opening that is adjustable.

4. The conditioning device according to claim 1, further comprising one or more rotating couplers for selectively securing the filter within the filter receiver.

5. The conditioning device according to claim 4, further comprising a filter receiver lip, wherein the filter has a first edge, and wherein the first edge of the filter is slidingly receivable within the filter receiving lip to at least partially retain the filter within the conditioning device.

6. The conditioning device according to claim 1, wherein the filter receiver is configured such that the mounting side is closer than the access panel to the filter when the filter is received within the filter receiver.

7. The conditioning device according to claim 1, wherein the filter is parallel to the mounting side of the frame when the filter is received within the filter receiver.

8. The conditioning device according to claim 1, wherein the conditioning device is configured to be coupled directly to the ceiling.

9. The conditioning device according to claim 8, wherein the filter is replaceable without removing the conditioning device from the ceiling.

10. The conditioning device according to claim 8, further comprising one or more gaskets disposed between at least one of the ceiling and the frame and between the frame and the access panel.

11. The conditioning device according to claim 8, wherein the conditioning device is configured to be mounted to the ceiling of a vehicle.

12. The conditioning device according to claim 8, wherein the access panel is parallel to the ceiling when the conditioning device is coupled to the ceiling and the access panel is coupled to the frame.

13. The conditioning device according to claim 1, wherein the access panel is coupled to the frame by a press-fit engagement therebetween.

14. The conditioning device according to claim 1, wherein the coupling features of the access panel include one or more magnets, wherein the access side of the frame includes one more magnetically-receptive mounts, and wherein the access panel is coupled to the frame at least in part by magnet attraction between the coupling features and the magnetically-receptive mounts.

15. The conditioning device according to claim 1, further comprising a cushion that at least partially covers the access panel such that the cushion is on an outside of the access panel when the access panel is coupled to the frame.

16. A conditioning device for replacing a ceiling-mounted faceplate that communicates air to and from an air conditioning unit via a ceiling, the conditioning device comprising:

a frame having a mounting side configured to be coupled to the ceiling, an access side that is opposite the mounting side, and a plurality of walls coupled between the mounting side and the access side, wherein the mounting side is configured to be coupled to a ceiling such that the mounting side is below the ceiling and the plurality of walls extend downwardly from the mounting side, wherein the mounting side defines a ventilation intake opening that communicates the air from the conditioning device into the air conditioning unit, wherein the access side defines an access opening that communicates the air into the conditioning device;

a filter receiver coupled to the frame and configured to retain a filter such that the air from outside the conditioning device is directed to the ventilation intake through the filter, wherein the filter is removable from the filter receiver while the filter receiver remains within the frame and while both the filter receiver and the frame remain in position relative to the ceiling; and an access panel having coupling features for removably coupling the access panel to the frame, wherein the access opening of the frame is accessible when the access panel is removed from the frame;

at least one inlet is defined within at least one of the frame and the access panel, and wherein the air enters the conditioning device through the at least one inlet;

wherein the air conditioning unit generates a sound output level at a location below the ceiling where the air enters the air ceiling when operating, further comprising sound attenuation material retained between the mounting side and the access side of the frame, wherein the sound attenuation material reduces the sound output level at the location below the ceiling relative to the sound output level without the sound attenuation material.

17. The conditioning device according to claim 16, wherein one or more of the at least one inlet is defined in the access panel, and wherein the ventilation intake opening and at least one of the at least one inlet are offset when the access panel is coupled to the frame.

* * * * *